United States Patent
Ferreol et al.

(10) Patent No.: US 7,787,571 B2
(45) Date of Patent: Aug. 31, 2010

(54) METHOD FOR THE HIGHER-ORDER BLIND DEMODULATION OF A LINEAR WAVEFORM TRANSMITTER

(75) Inventors: Anne Ferreol, Colombes (FR); Laurent Albera, Boulogne Billancourt (FR); Joséphine Castaing, Paris (FR)

(73) Assignee: Thales (FR)

( * ) Notice: Subject to any disclaimer, the term of this patent is extended or adjusted under 35 U.S.C. 154(b) by 1051 days.

(21) Appl. No.: 10/578,607

(22) PCT Filed: Oct. 29, 2004

(86) PCT No.: PCT/EP2004/052734

§ 371 (c)(1),
(2), (4) Date: May 8, 2006

(87) PCT Pub. No.: WO2005/046150

PCT Pub. Date: May 19, 2005

(65) Prior Publication Data

US 2007/0140380 A1  Jun. 21, 2007

(30) Foreign Application Priority Data

Nov. 7, 2003  (FR) .................... 03 13125

(51) Int. Cl.
  *H04L 27/00* (2006.01)
(52) U.S. Cl. .................. 375/324; 375/322; 375/316
(58) Field of Classification Search .................. 375/324, 375/322, 316
  See application file for complete search history.

(56) References Cited

U.S. PATENT DOCUMENTS 5,872,816 A * 2/1999 Parr et al. .................... 375/341

6,240,098 B1 * 5/2001 Thibault et al. ............. 370/431
2002/0122397 A1 * 9/2002 Ling et al. .................. 370/335

(Continued)

FOREIGN PATENT DOCUMENTS

FR  2774217  4/2000

(Continued)

OTHER PUBLICATIONS

Zarzoso V et al: "Closed-Form Estimators for blind separation of sources-Part 1: Real Mixtures" Wireless Personal Communications, Kluwer Academic Publishers, NL Apr. 1, 2002, pp. 5-28.

(Continued)

*Primary Examiner*—Chieh M Fan
*Assistant Examiner*—Kenneth Lam
(74) *Attorney, Agent, or Firm*—Lowe Hauptman Ham & Berner, LLP

(57) ABSTRACT

Process for the blind demodulation of a linear waveform source or transmitter in a system comprising one or more sources and an array of sensors and a propagation channel. The process comprises at least the following steps:
  the symbol period T is determined and sampled to Te such that $T=IT_e$ (I being an integer);
  a spatio-temporal observation $z(t)$, the mixed sources of which are symbol trains from the transmitter, is constructed from the observations $x(kT_e)$;
  an ICA-type method is applied to the observation vector $z(t)$ in order to estimate the $L_c$ symbol trains $\{a_{m-i}\}$ that are associated with the channel vectors $\hat{h}_{z,j}=\hat{h}_z(k_j)$;
  the $L_c$ outputs $(\hat{a}_{m,j}, \hat{h}_{z,j})$ are arranged in the same order as the inputs $(a_{m-i}, h_z(i))$ so as to obtain the propagation channel vectors $\hat{h}_{z,j}=\hat{h}_z(k_j)$; and
  the phase $\alpha_{imax}$ associated with the outputs is determined.

3 Claims, 5 Drawing Sheets

U.S. PATENT DOCUMENTS

Figure 1:
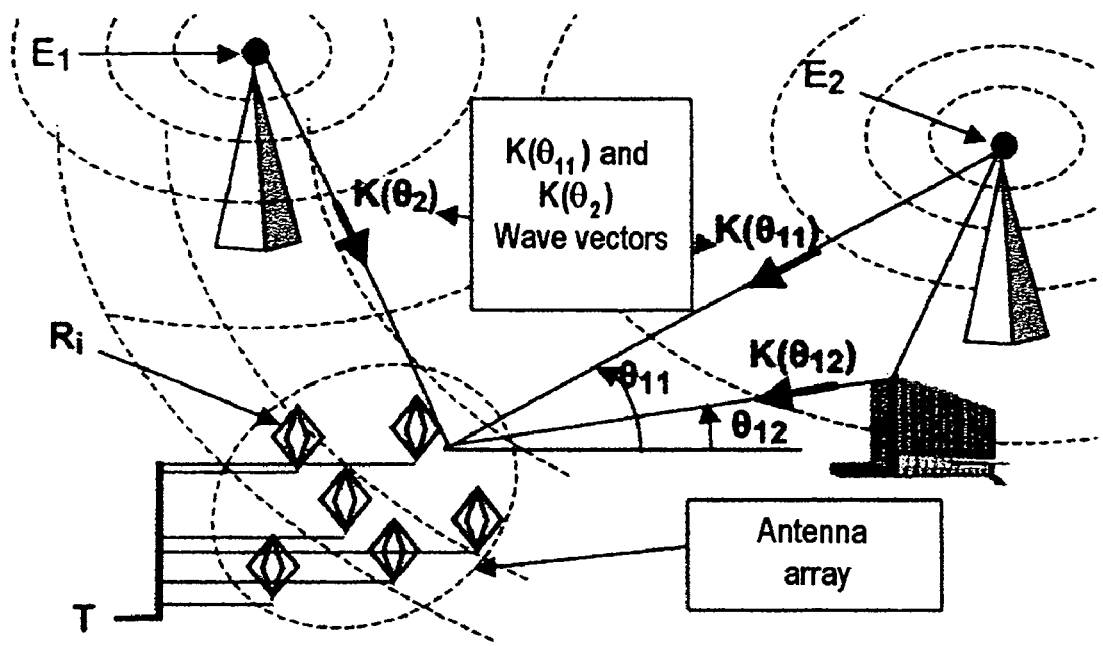

| | | | | |
|---|---|---|---|---|
| 2003/0204380 | A1* | 10/2003 | Dishman et al. | 702/189 |
| 2004/0147227 | A1* | 7/2004 | Hamalainen et al. | 455/69 |
| 2008/0075033 | A1* | 3/2008 | Shattil | 370/328 |
| 2009/0220031 | A1* | 9/2009 | Ferreol | 375/340 |

OTHER PUBLICATIONS

Warner E S et al: "Single-chanel blind signal separation of filtered MPSK signals" IEE Proceedings: Radar, Sonar & Navigation, Institution of Electrical Engineers, GB; Dec. 1, 2003 pp. 396-402.

Schimdt, Ralph O., "Multiple Emitter Location and Signal Parameter Estimation", IEEE Transactions on Antennas and Propagation, vol. AP-34, No. 3, Mar. 1986, pp. 276-280.

Roberts, Randy S., et al., "Computationally Efficient Algorithms for Cyclic Spectral Analysis", IEEE SP Magazine, Apr. 1991, pp. 38-49.

Schell, Stephan V., et al., "Detection of the Number of Cyclostationary Signals in Unknown Interference and Noise", Proc, Asilonan Conference on Signal, Systems and Computers, Maple Press, Nov. 5-9, 1990, pp. 473-477.

Cardoso, Jean-Francois, et al., "Blind Beamforming for Non Gaussian Signals", IEEE Proceedings -F, vol. 140, No. 6, pp. 362-370, Dec. 1993.

Comon, Pierre, "Independent Component Analysis, A New Concept", Signal Processing, Elsevier, Apr. 1994, vol. 36, No. 3, pp. 287-314.

Mayrargue, Sylvie, "A Blind Spatio-Temporal Equalizer for a Radio-Mobile Channel Using the Constant Modulus Algorithm (CMA)", ICASSP 94, 1994 IEEE International Conference on Acoustics Speech and Signal Processing, Apr. 19-22, 1994, Adelaide, South Australia, pp. 317-320.

Moulines, E., et al., "Subspace Methods for the Blind Identification of Multichannel Fir Filters", IEEE Transactions on Signal Processing, vol. 43, No. 2, pp. 516-525, Feb. 1995.

Vanderveen, M. C., et al., "Joint Angle and Delay Estimation (JADE) for Signals in Multipath Environments", 30th ASILOMAR Conference in Pacific Grove, IEEE Computer Society, Los Alamitos, CA, USA, Nov. 3-6, 1996, pp. 1250-1254.

Chevalier, Pascal, et al., "Behaviour of Higher Order Blind Source Separation Methods in the Presence of Cyclostationary Correlated Multipaths", IEEE SP Workshop on HOS, Alberta (Canada), Jul. 1997, pp. 363-367.

Papadia, Constantinos, et al., "Fractionally Space Equalization of Linear Polyphase Channels and Related Blind Techniques Based on Multichannel Linear Prediciton", IEEE Transactions on Signal Processing, Mar. 1999, vol. 47, No. 3, pp. 641-654.

de Carvalho, Elisabeth, et al., "A Fast Gaussian Maximum-Likelihood Method for Blind Multichannel Estimation", SPAWC 99, Signal Processing Advances in Wireless Communications, May 9-12, 1999, Annapolis, US, pp. 279-282.

Zeng, Hanks H., et al., "Blind Channel Estimation Using the Second-Order Statistics: Algorithms", IEEE Transactions on Signal Processing, Aug. 1999, vol. 45, No. 8, pp. 1919-1930.

Ferreol, Anne, et al., "On the Behavior of Current Second and Higher Order Blind Source Separation Methods for Cyclostationary Sources", IEEE Trans. Sig. Proc., vol. 48, No. 6, pp. 1712-1725, Jun. 2000.

Comon, Pierre, "From Source Separation to Blind Equalization, Contrast-Based Approaches", ICISP 01, Int. Conf. on Image and Signal Processing, May 3-5, 2001, Agadir, Morocco, pp. 20-32.

Perros-Meilhac, Lisa, et al., "Blind Identification of Multipath Channels: A Parametric Subspace Approach", IEEE Transactions on Signal Processing, vol. 49, No. 7, pp. 1468-1480, Jul. 2001.

Jang, Inseon, et al., "Why Blind Source Separation for Blind Equalization of Multiple Channels?", SAM 02, Second IEEE Sensor Array and Multichannel Signal Processing Workshop, Aug. 4-6, 2002, Rosslyn, US, pp. 269-272.

Ferreol, Anne, et al., "Higher Order Blind Separation of Non Zero-Mean Cyclostationary Sources", EUSIPCO 2002, Toulouse, Sep. 3-6, 2002, pp. 103-106.

Albera, Laurent, et al., "ICAR, Un Algorithme d"ICA a Convergence Rapide, Robuste Au Bruit" (ICAR, A Noise-Robust Rapidly Convergent Algorithm), Gretsi, Paris, 2003.

Ding, Zhi, et al., "A Cumulant Matrix Subspace Algorithm for Blind Single FIR Channel Identification", IEEE Transactions on Signal Processing, vol. 49, No. 2, pp. 325-333, Feb. 2001.

* cited by examiner

METHOD FOR THE HIGHER-ORDER BLIND DEMODULATION OF A LINEAR WAVEFORM TRANSMITTER

The object of the invention relates to a process for the blind demodulation of signals output by several transmitters and received by an array made up of at least one sensor.

For example, it applies to an array of antennas in an electromagnetic context.

The subject of the invention is in particular the demodulation of signals, that is to say the extraction of the symbols $\{a_k\}$ transmitted by a linearly modulated transmitter.

FIG. 1 shows an antenna processing system comprising several transmitters $E_i$ and an antenna processing system T comprising several antennas $R_i$ receiving from radio sources at different angles of incidence. The angles of incidence of the sources or transmitters may be parameterized either in 1D with the azimuth $\theta_m$, or in 2D with the azimuth angle $\theta_m$ and the elevation angle $\Delta_m$.

Figure 3:
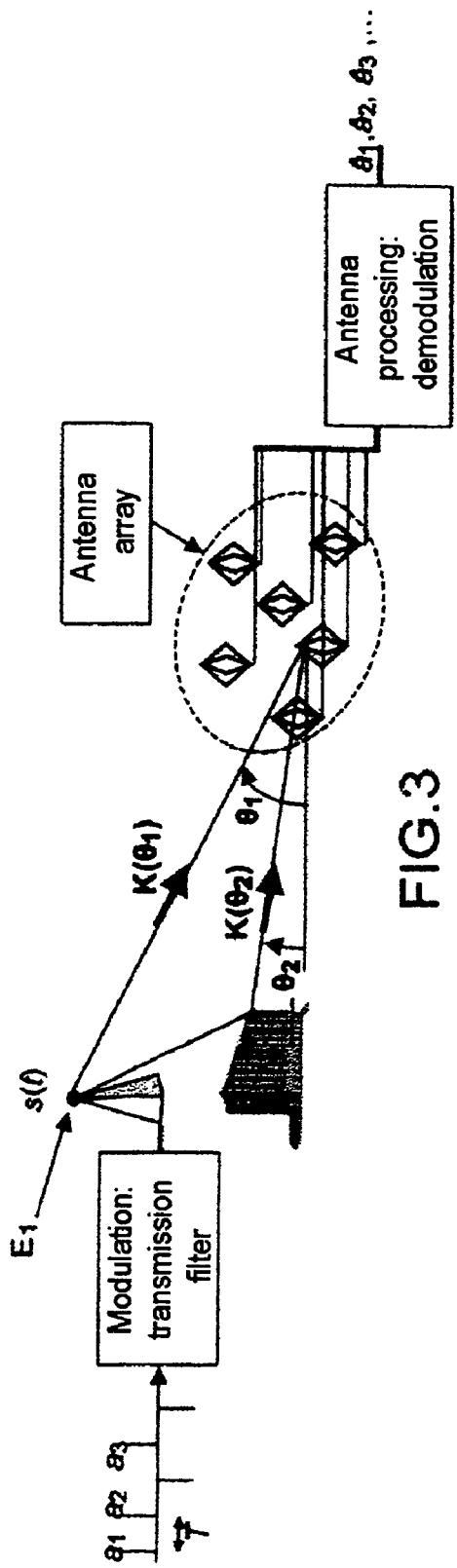

FIG. 3 shows schematically a modulation/demodulation principle for the symbols $\{a_k\}$ output by a transmitter. The signal propagates via a multipath channel. The transmitter outputs the symbol $a_k$ at the instant k.T, where T is the symbol period. The demodulation consists in estimating and in detecting the symbols in order to obtain, at the output of the demodulator, the estimated symbols $\hat{a}_k$. In this figure, the train of symbols $\{a_k\}$ is linearly filtered upon transmission by a transmission filter H, also called a wave-shaping filter $h_0(t)$.

In the rest of the description, the expression "blind demodulation" is understood to mean techniques that basically use no information on the signal output, examples being a wave-shaping filter, a learning sequence, etc.

The last ten years have seen the development of SIMO (single-input, multiple-output) blind demodulation techniques called subspace techniques using 2nd-order statistics, as described in reference [7]. However, these algorithms have the drawback of not being robust to either underestimation or overestimation of the order of the propagation channel, resulting in temporal spreading dependent on the multipaths and on the wave-shaping filter. A linear prediction technique, described in reference [11], has been proposed for overcoming this problem, but this has the drawback of being less effective when the length of the channel is known. To improve the subspace techniques, the method described in [16] proposes a parametric technique, but unfortunately this requires knowledge of the wave-shaping filter.

In reference [13], the authors propose a technique based on covariance matching, but this has in particular the drawback of being very difficult to implement. An easier but suboptimal technique, described in reference [12], was therefore developed by minimizing a likelihood criterion and assuming the symbols to be Gaussian in character. This assumption is not verified for the widely used linear modulations such as PSK (Phase Shift Keying) or QAM (Quadrature Amplitude Modulation).

It is also known, in CMA (Constant Modulus Algorithm) methods, to use a spatio-temporal approach described for example in reference [6]. However, this family of methods has the drawback of being suitable only for one particular class of modulations, such as PSK, which are constant-modulus modulations. This method is iterative and therefore has the drawback of having to be correctly initialized. Finally, the CMA methods have the disadvantage of converging more slowly than the abovementioned subspace method. Moreover, reference [20] describes a subspace method making use of higher-order statistics for non-minimum-phase FIR (finite impulse response) channel identification.

The subject of the present invention is a process based in particular on blind source separation techniques known to those skilled in the art and described for example in references [4], [5], [15] and [19] assuming that the symbols transmitted are statistically independent. To do this, the process constructs a spatio-temporal observation whose mixed sources are symbol trains from the transmitter. Each symbol train is for example the same symbol train but shifted by an integral number of symbol periods T.

The invention relates to a process for the blind demodulation of a linear-waveform source or transmitter in a system comprising one or more sources and an array of sensors and a propagation channel, said process being characterized in that it comprises at least the following steps:

the symbol period T is determined and samples are taken at $T_e$ such that $T=IT_e$ (I being an integer);

a spatio-temporal observation z(t), the mixed sources of which are symbol trains from the transmitter, is constructed from the observations $x(kT_e)$;

an ICA-type method is applied to the observation vector z(t) in order to estimate the $L_c$ symbol trains $\{a_{m-i}\}$ that are associated with the channel vectors $\hat{h}_{z,j}=\hat{h}_z(k_j)$;

the $L_c$ outputs $(\hat{a}_{m,j}, \hat{h}_{z,j})$ are arranged in the same order as the inputs $(a_{m-i}, h_z(i))$ so as to obtain the propagation channel vectors $\hat{h}_{z,j}=\hat{h}_z(k_j)$; and the phase $\alpha_{i_{max}}$ associated with the outputs is determined.

The process according to the invention offers in particular the following advantages:

it makes no assumption about the symbol constellations, unlike the methods described in the prior art;

it requires no knowledge of the wave-shaping filter;

the modulus of the symbols is not assumed to be constant;

it is robust to channel length overestimation;

it can handle propagation channels with correlated paths; and it is direct and simple to implement, with no correlated-path crosscheck step.

Figure 2:
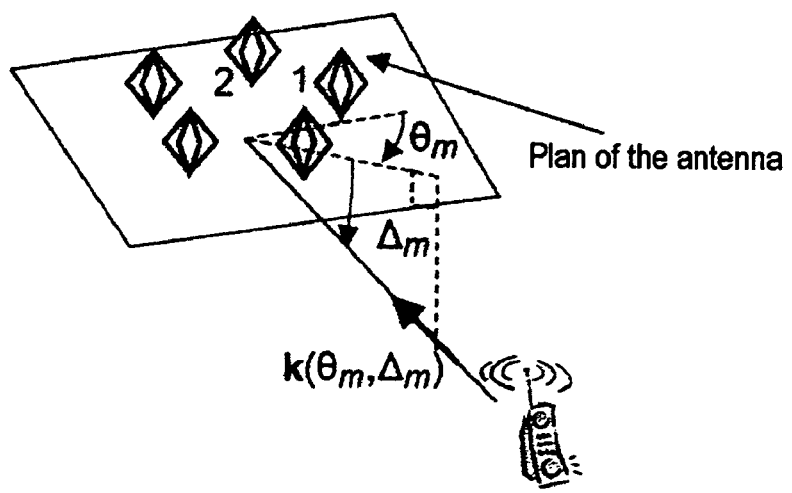
Figure 4:
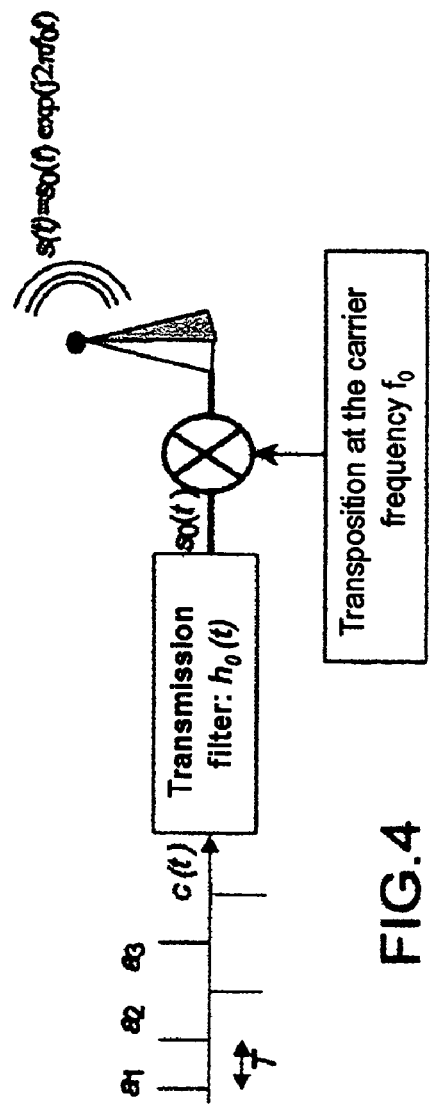
Figure 5:
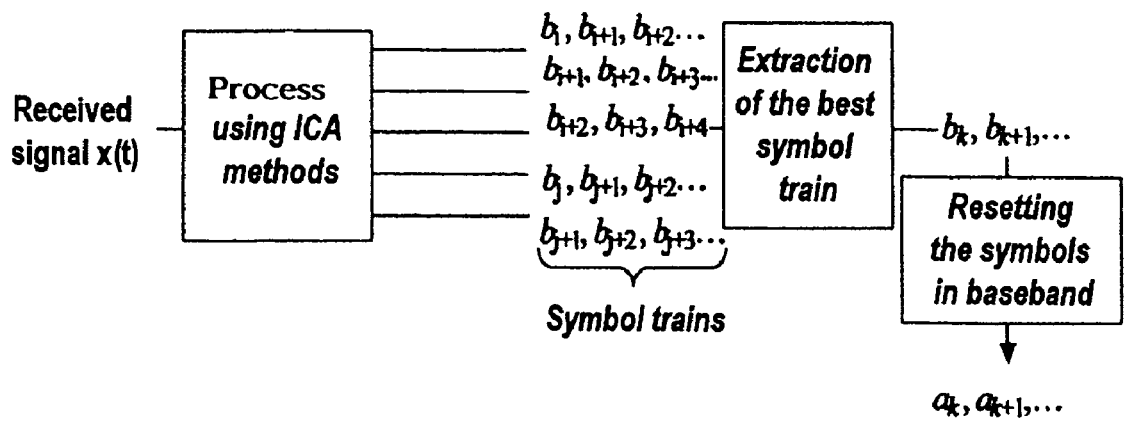
Figure 6:
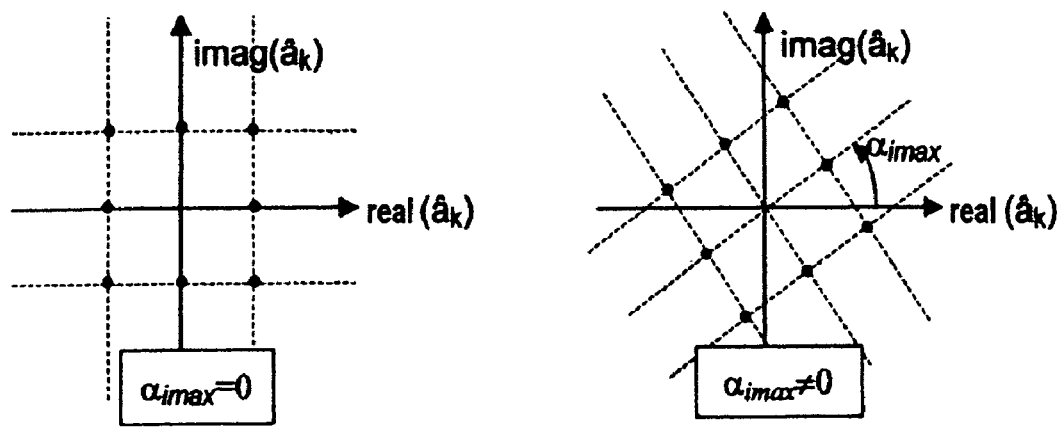
Figure 7:
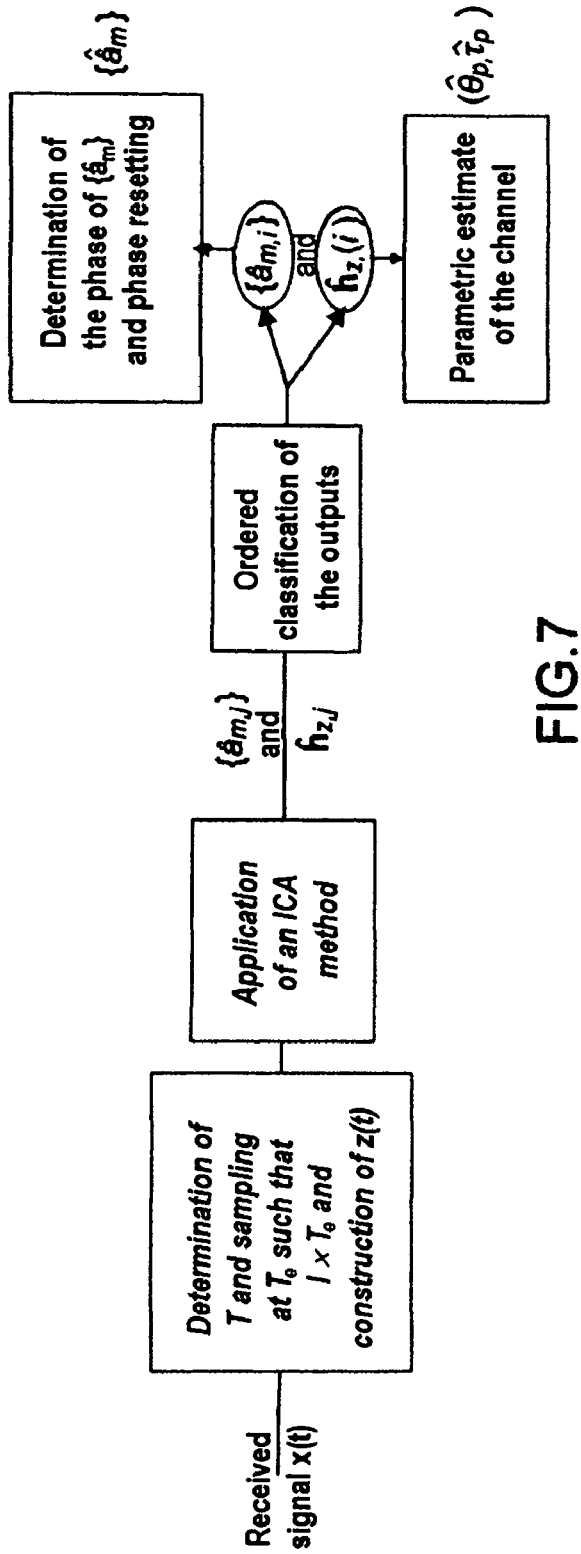
Figure 8:
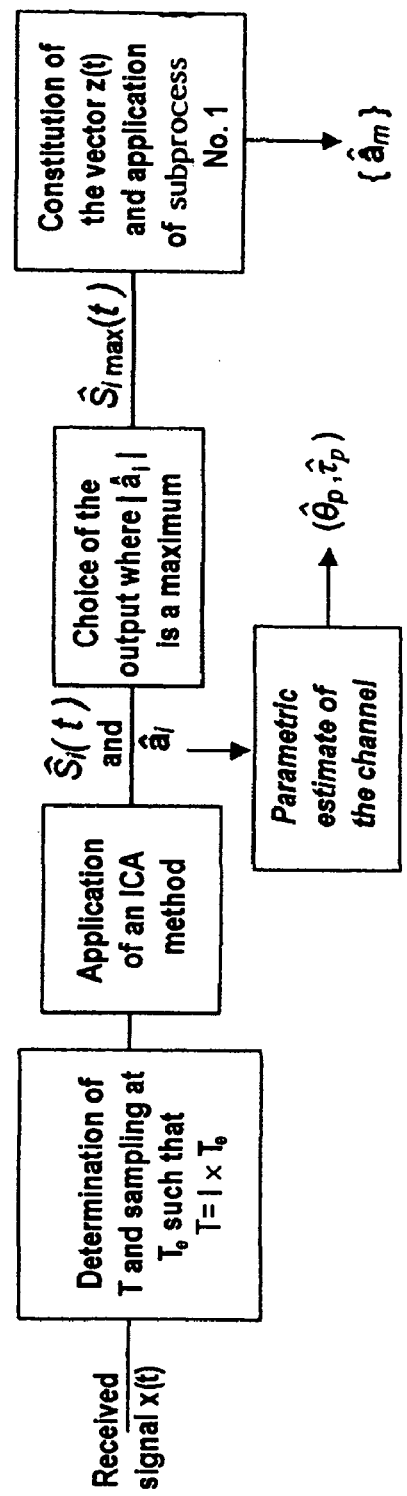
Figure 9:
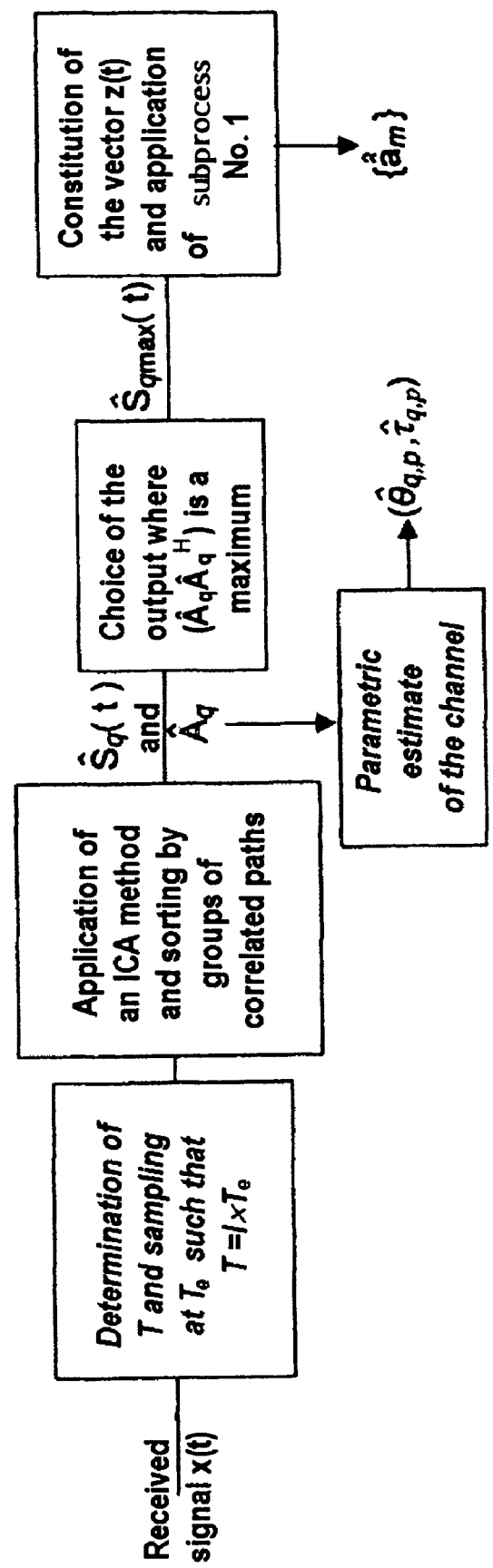

Other features and advantages of the subject of the present invention will become more clearly apparent on reading the following description, given by way of illustration but implying no limitation, and on examining the appended figures, which show:

FIG. 1, an example of an architecture;

FIG. 2, the angles of incidence of the sources;

FIG. 3, the linear modulation and demodulation process for a symbol train;

FIG. 4, the diagram of a linear-modulation transmitter;

FIG. 5, a summary of the general principle employed in the invention;

FIG. 6, the representation of a constellation;

FIG. 7, a first example of the implementation of the method, in which the signal is received baseband;

FIG. 8, a second example in which the signal is received in baseband and the multipaths are decorrelated; and FIG. 9, a third example in which the signal is received in baseband and the multipaths are groupwise decorrelated.

To explain the process according to the invention more clearly, the following description relates to a process for the higher-order blind demodulation of a linear-waveform transmitter in an array having a structure as described in FIG. 1 for example.

Before explaining the steps for implementing the process, the model of the signal used will be described.

Model of the Signal Output by a Source or Transmitter Linear Modulation

FIGS. 3 and 4 show the process for the linear modulation of a symbol train $\{a_k\}$ at the rate T by a wave-shaping filter $h_0(t)$.

The comb of symbols c(t) is firstly filtered by the wave-shaping filter $h_0(t)$ and then transposed to the carrier frequency $f_0$. The NRZ filter, which is a time window of length T, very often defined by $h_0(t)=\Pi_T(t-T/2)$, is one particular nonlimiting example of a transmission filter. In radio communication, it is also possible to use a Nyquist filter, the Fourier transform of which, $h_0(f) \approx \Pi_B(f-B/2)$, approaches a band window B when the roll-off is zero, therefore $h_0(f)=\Pi_B(f-B/2)$ (the roll-off defines the slope of the filter away from the band B).

The modulates signal $s_0(t)$, output by the transmitter, may be expressed at time $t_k=kT_e$ ($T_e$ being the sampling period) as a function of the comb of symbols c(t):

$$s_0(kT_e) = \sum_i h_0(iT_e)c((k-i)T_e) \quad (1)$$

Let the symbol time T be equal to an integer number of times the sampling period, i.e. $T=IT_e$, and let $k=mI+j$ where $0 \leq j < I$. Since $c(t)=\Sigma_r a_r \delta(t-rT_e)$, in other words $c(t)=a_u$ for $t=uIT_e$ and $c(t)=0$ for $t \neq uIT_e$, the only values for i for which $c((k-i)T_e)$ is non zero satisfy the equation $k-i=uI$, that is to say such that $i=mI+j-uI=nI+j$, where $n=m-u$. Finally, equation (1) becomes:

$$s_0(mIT_e + jT_e) = \sum_{n=-L_0}^{L_0} h_0(nIT_e + jT_e)a_{m-n} \text{ for } 0 \leq j < I \quad (2)$$

The parameter $L_0$ is the half-length of the transmission filter which is spread over a duration of $(2L_0+1)IT_e$. In the particular case of an NRZ transmission filter, $L_0=0$. As regards the transmitted signal s(t), this satisfies the equation $s(t)=s_0(t)\exp(j2\Pi f_0 t)$ as it is equal to the signal $s_0(t)$ transposed to the frequency $f_0$. Under these conditions, the expression $s(mT_e+jT_e)$ is, from (2):

$$s(mIT_e + jT_e) = \sum_{n=-L_0}^{L_0} h_0(nIT_e + jT_e)\exp(j2\pi f_0(nI+j)T_e) \quad (3)$$
$$a_{m-n}\exp(j2\pi f_0(m-n)IT_e)$$
$$= \sum_{n=-L_0}^{L_0} h_{F0}(nIT_e + jT_e)b_{m-n} \text{ such that } 0 \leq j < I$$

where $h_{F0}(iT_e) = h(iT_e)\exp(j2\pi f_0 iT_e)$ and
$b_i = a_i \exp(j2\pi f_0 i IT_e)$ Reception of the Signals by the Sensors The transmitted signal s(t) (FIG. 3) passes through a propagation channel before being received on an array made up of N antennas. The propagation channel may be modelled by P multipaths of angle of incidence $\theta_p$, delay $\tau_p$ and amplitude $\rho_p$ ($1 \leq p \leq P$). At the output of the antennas is the vector x(t), which corresponds to the sum of a linear mixture of P multipaths and noise, assumed to be white and Gaussian. This vector of dimension N×1 is given by the following expression:

$$x(t) = \sum_{p=1}^{P} \rho_p a(\theta_p) s(t - \tau_p) + b(t) \quad (4)$$
$$= As(t) + b(t)$$

where $\rho_p$ is the amplitude of the pth path, b(t) is the noise vector, assumed to be Gaussian, $a(\theta)$ is the response of the array of sensors to a source with angle of incidence $\theta$, and $A=[a(\theta_1) \ldots a(\theta_P)]$ and $s(t)=[s(t-\tau_1) \ldots s(t-\tau_P)]^T$. Noting that $\tau_p = r_p T + \Delta \tau_p$ (where $0 \leq \Delta \tau_p < T = IT_e$ and $r_p$ is an integer), and inserting equation (3) into equation (4), the vector received by the antennas is given by:

$$x(mIT_e + jT_e) = \quad (5)$$
$$\sum_{p=1}^{P} \sum_{n=-L_0}^{L_0} \rho_p a(\theta_p) h_{F0}(nIT_e + jT_e - \Delta\tau_p) b_{m-n-r_p} + b(mIT_e + jT_e)$$

By making the change of variable according to $u_p = n + r_p$, the vector received by the antennas is given by:

$$x(mIT_e + jT_e) = \quad (6)$$
$$\sum_{p=1}^{P} \sum_{u_p=r_p-L_0}^{r_p+L_0} \rho_p a(\theta_p) h_{F0}((u_p - r_p)IT_e + jT_e - \Delta\tau_p) b_{m-u_p} +$$
$$b(mIT_e + jT_e)$$

Noting $r_{min}=\min\{r_p\}$ and $r_{max}=\max\{r_p\}$, equation (6) may be rewritten as follows:

$$x(mIT_e + jT_e) = \quad (7)$$
$$\sum_{p=1}^{P} \sum_{u=r_{min}-L_0}^{r_{min}+L_0} \rho_p a(\theta_p) h_{F0}((u - r_p)IT_e + jT_e - \Delta\tau_p) Ind_{[r_p-L_0, r_p+L_0]}(u)$$
$$b_{m-u} + b(mIT_e + jT_e)$$

where $Ind_{[r,q]}(u)$ is the usual indicatrix function ($Ind_{[r,q]}(u)=1$ for $r \leq u \leq p$ and $Ind_{[r,q]}(u)=0$ otherwise) defined over the set of integers relating to the value in the binary set $\{0,1\}$, characterized by $Ind_{[r,q]}(u)=1$ if u belongs to the interval [r,q] and $Ind_{[r,q]}(u)=0$ otherwise. Thus, denoting the channel vector by v(t):

$$v(uIT_e + jT_e) = \quad (8)$$
$$\sum_{p=1}^{P} \rho_p a(\theta_p) h_{F0}((u - r_p)IT_e + jT_e - \Delta\tau_p) Ind_{[r_p-L_0, r_p+L_0]}(u)$$

where $t=uIT_e+jT_e$ and equation (5) becomes:

$$x(mIT_e + jT_e) \sum_{u=r_{min}-L_0}^{r_{min}+L_0} v(uIT_e + jT_e)b_{m-u} + b(mIT_e + jT_e) \quad (9)$$

Inter-Symbol Interference

The observation vector $x(t)$ coming from the antenna array at $t=mIT_e+jT_e$ involves, from equation (9), the symbol $b_m$, but also the symbols $b_{m-u}$ where u is a relative integer lying within the $[r_{min}-L_0, r_{max}+L_0]$ interval, which phenomenon is more widely known as ISI (inter-symbol interference). Let $L_c$ be the number of symbols participating in the ISI and let the interval of values taken by the latter be limited. From equation (9), if the intersection of the intervals $[r_p-L_0, r_p+L_0]$ is non-empty, then $L_c=|r_{max}-r_{min}|+2L_0+1$. Consequently, when $r_{max}=r_{min}$, that is to say when all the multipaths are correlated, the lower bound of $L_c$ is reached and is given by $L_c=2L_0+1$. This case is also mathematically expressed by $$\left| \max_p \{\tau_p\} - \min_p \{\tau_p\} \right| < T.$$

On the other hand, if the intersection of said intervals is empty and if all the intervals $[r_p-L_0, r_p+L_0]$ are disjoint, then $L_c=P\times(2L_0+1)$, which constitutes an upper bound for the set of values that can be taken by $L_c$. The latter situation corresponds specifically to the case of multipaths that are all pair-wise decorrelated. This may also be mathematically expressed as $\forall i\neq j$, $|r_i-r_j|>2L_0$, this condition being obtained whenever $|\tau_i-\tau_j|>(2L_0+1)T$. To summarize, the quantity $L_c$ is in general bounded as follows:

$$2L_0+1 \leq L_c \leq P\times(2L_0+1) \quad (10)$$

The equation expressing the vector received by the sensors can then be rewritten in the following manner, but this time only the $L_c$ symbols $b_{m-u}$ of interest appear:

$$X(mIT_e + jT_e) = \sum_{l=1}^{L_0} h(n(l)IT_e + jT_e)b_{m-n(l)} + b(mIT_e + jT_e) \quad (11)$$

where $\forall 1 \leq l \leq L_c$ and $r_{min}-L_0 \leq n(l) \leq r_{min}+L_0$ and where:

$$h(t) = \sum_{p=1}^{P} \rho_p a(\theta_p) h_{F0}(t - \tau_p) \quad (12)$$

ICA Techniques

The process uses ICA techniques based on the following model, given by way of entirely nonlimiting illustration:

$$u_k = \sum_{i=1}^{L} g_i s_{ik} + n_k \quad (13)$$
$$= G s_k + n_k$$

where $u_k$ is a vector of dimension $M\times 1$ received at time k, $s_{ik}$ is the ith component of the signal $s_k$ at time k, n is the noise vector and $G=[g_1 \ldots g_L]$. The objective of the ICA methods is to extract the I=L components $s_{ik}$ and to identify their signatures $g_i$ (the vectorial response of source i through the observation $u_k$) on the basis of the observation $u_k$. The number I=L of components must not exceed the dimension M of the observation vector. The methods of references [4], [5] and [15] use 2nd- and 4th-order statistics of the observations $u_k$. The first step uses 2nd-order statistics for the observations $u_k$ (these observations may be functions of the signals received by the sensors) in order to obtain a new observation $z_k$, such that:

$$z_k = W_1 u_k \quad (14)$$
$$= \sum_{i=1}^{L} \check{g}_i s_{ik} + \tilde{n}_k$$
$$= \check{G} s_k + \tilde{n}_k$$

where the signatures $\check{g}_i$ ($1 \leq i \leq L$) are orthogonal, $\check{G}=[\check{g}_1 \ldots \check{g}_L]$ and $s_k=[s_{1k} \ldots s_{Lk}]^T$. The second step consists in identifying the orthogonal base of the G values using 4th order statistics of the whitened observations $z_k$. In this way, the signals $s_k$ may be extracted by effecting:

$$\hat{s}_k = \check{G}^\# z_k = \check{G}^\# W_1 u_k \quad (15)$$

where $\hat{S}_k$ is the estimate of the signals $s_k$ and where $^\#$ is the pseudo-inversion operator defined by $G^\#=(G^H G)^{-1} G^H$.

The ICAR method [19] uses only 4th-order statistics to identify the matrix $G=[g_1 \ldots g_k]$ of signatures.

To summarize, the idea employed in the process according to the invention is to construct a spatio-temporal observation, the mixed sources of which are symbol trains from the transmitter. Each symbol train is for example the same symbol train but shifted by an integral number of symbol periods T.

Several ways of implementing the method will be described below, some of which are explained by way of non-limiting illustration.

First Way of Implementing the Process.

FIG. 7 shows a first illustrative way of implementing the process in which the signal is received in baseband.

The method comprises a step I.1 of determining the symbol time $T_e$, for example by applying a cyclic detection algorithm, such as that described for example in [1] [10].

The next step I.2 consists in interpolating the observations $x(t)$ with I samples per symbol, such that $T=IT_e$.

Under these conditions where $f_0=0$ and $b_k=a_k$, equation (11) for the vector becomes:

$$x(mIT_e + jT_e) = \quad (16)$$
$$\sum_{l=1}^{L_0} h(n(l)IT_e + jT_e)a_{m-n(l)} + b(mIT_e + jT_e) \text{ for } 0 \leq j < I$$

Since equation (16) is valid for $0 \leq j < I$, the method constructs the next spatio-temporal observation (step I3) from the observations $x(kT_e)$:

$$z(mIT_e) = \begin{bmatrix} x(mIT_e) \\ x(mIT_e + T_e) \\ \vdots \\ x(mIT_e + (I-1)T_e) \end{bmatrix} \quad (17)$$

$$= \sum_{l=1}^{L_c} h_z(n(l))a_{m-n(l)} + b_z(mIT_e) \text{ where } h_z(n)$$

$$= \begin{bmatrix} h_{n,0} \\ h_{n,1} \\ \vdots \\ h_{n,I-1} \end{bmatrix}$$

with $h_{n,j} = h(nIT_e + jT_e)$ and $b_z(mIT_e) = [b(mIT_e)^T \ldots b(mIT_e + (I-1)T_e)^T]^T$.

Since it is known that x(t) has the dimensions N×1, the vector z(t) has the dimensions NI×1.

h(k) is a vector whose nth component is the kth component of the filter that linearly filters the symbol train $\{a_m\}$ on the nth sensor. The filter for the vector coefficient h(k) depends both on the wave-shaping filter and on the propagation channel.

To extract the $L_c$ symbol trains $\{a_{m-i}\}$ of interest (the number of symbols participating in the ISI), the method samples the received signal with I=(2L$_0$+1), assuming that P≦N.

Since it is known that the NRZ filter satisfies 2L$_0$+1=1 and the Nyquist filter 2L$_0$+1=3 for a roll-off of 0.25, the symbol trains may be extracted for these two wave-shaping filters when P≦NI and 3P≦NI, respectively.

Having determined the observation vector z(t), the process applies an ICA-type method to estimate the $L_c$ symbol trains $\{a_{m-i}\}$ associated with the channel vectors $\hat{h}_{z,j}=\hat{h}_z(k_j)$.

The jth output of the ICA method gives the symbol train $\{\hat{a}_{m,j}\}$ associated with the channel vector $\hat{h}_{z,j}$. The estimated symbol trains $\{\hat{a}_{m,j}\}$ arrive in a different order from that of the $\{a_{m-i}\}$ trains satisfying:

$$\hat{a}_{m,j}=\rho \exp(j\alpha_i)a_{m-i} \text{ and } \hat{h}_{z,j}=\hat{h}_z(i) \quad (18)$$

The symbol trains $\{\hat{a}_{m,j}\}$ are estimated with the same amplitude because the symbol trains $\{a_{m-i}\}$ all have the same power, satisfying the equation:

$$E[|a_{m-n(1)}|^2]= \ldots =E[|a_{m-n(L_c)}|^2].$$

The next step I.4 of the process has the objective of ordering the $L_c$ outputs $(\hat{a}_{m,j},\hat{h}_{z,j})$ in the same order as the inputs $(a_{m-i}, \hat{h}_z(i))$ so as to obtain the channel vectors $\hat{h}_{z,j}=\hat{h}_z(k_j)$. To do this, the process intercorrelates pairwise the outputs $\hat{a}_{m,i}$ and $\hat{a}_{m,j}$, calculating the following criterion $c_{i,j}(k)$:

$$c_{i,j}(k) = \frac{E[\hat{a}_{m,i}\hat{a}^*_{m-k,j}]}{\sqrt{E[\hat{a}_{m,i}\hat{a}^*_{m,i}]E[\hat{a}_{m-k,j}\hat{a}^*_{m-k,j}]}} \quad (19)$$

When the function $|c_{i,j}(k)|$ is a maximum in k=k$_{max}$, the ith and jth outputs satisfy the equation: $\hat{a}_{m,i}=\hat{a}_{m-k\,max,j}$. The algorithm for classifying the outputs $\hat{a}_{m,n(1)} \ldots \hat{a}_{m,n(Lc)}$ is for example composed of the following steps:

Step A.1: Determination of the output $\hat{a}_{m,imax}$ associated with the channel vector of higher-modulus $\hat{h}_{z,jmax}$.

Step A.2: For all the outputs $\hat{a}_{m-k,j}$ where j≠i$_{max}$, determination of the indices k=k$_j$ maximizing the $|c_{imax,j}(k)|$ criterion.

From this is deduced, for each j, that $\hat{a}_{m,imax}=\hat{a}_{m-kj,j}$. Since it is known that $c_{imax,j}(k_j)=\exp(j\alpha_{imax}-j\alpha_j)$ the jth output is reset to the same phase as the iith i$_{max}$ output by taking $\hat{a}_{m-kj}=c_{imax,j}(k_j)\hat{a}_{m,j}$. The channel vectors are also reset in terms of phase by taking: $\hat{h}_z(k_j)=\hat{h}_{z,j}c_{imax,j}(k_j)^*$.

Step A.3: This step reorders the outputs $\hat{a}_{m-kj}$ and the channel vectors $\hat{h}_{z,j}=\hat{h}_z(k_j)$ in the increasing order of the $K_j$, since it is known that $\hat{a}_m=\hat{a}_{m,imax}$ and that $\hat{h}_z(0)=\hat{h}_{z,imax}$.

After these three steps, the symbol trains $\{\hat{a}_{m-k}\}$ associated with the channel vectors $\hat{h}_z(k_j)$ are obtained. Since it is known that the estimated symbols satisfy the equation $\hat{a}_{m-k}=\exp(j\alpha_{imax})a_{m-k}$, the last step of the process consists in estimating this phase $\alpha_{imax}$. To do this, the constellation of symbols $a_k$ is firstly identified among a database consisting of the set of possible constellations. This database consists of known constellations such as nPSK, n-QAM. Each time that a new constellation is detected or becomes known, this is added to the database.

FIG. 6 shows an example of an 8-QAM constellation when $\alpha_{imax}=0$ and $\alpha_{imax}\neq 0$. In this implementation example, the process then includes the following steps:

The next step I.5 consists in determining the output phase associated with the channel vector of higher modulus. To identify the constellation and determine the phase, the process performs, for example, the following steps:

Step I.5=Steps B.1, B.2 and B.3

Step°B.1: Estimation of the positions of the states of the constellation (red points in the figure) by seeking the maximum of the 2D histogramme of the points $M_k=(real(\hat{a}_k), imag(\hat{a}_k))$. For a constellation consisting of M states, M pairs $(\hat{u}_m, \hat{v}_m)$ for $1 \leq m \leq M$ are obtained.

Step°B.2: Determination of the type of constellation by comparing the position of the states $(\hat{u}_m, \hat{v}_m)$ of the constellation of $\{\hat{a}_k\}$ symbols with a database comprising the set of possible constellations. The closest constellation is made up of the states $(u_m, v_m)$ for $1 \leq m \leq M$.

Step B.3: Determination of the phase $\alpha_{imax}$ by minimizing in the sense of the least squares the following system of equations:

$\hat{u}_m = \cos(\alpha_{imax})u_m - \sin(\alpha_{imax})v_m$ and
$\hat{v}_m = \sin(\alpha_{imax})u_m + \cos(\alpha_{imax})v_m$ for $1 \leq m \leq M$.

The process may include a step of estimating the propagation channel parameters of angle $\theta_p$ and delay $\tau_p$, of equation (8) by the algorithm proposed in [8]. The step consists in extracting firstly the vectors h(nIT$_e$+jT$_e$) for 0≦j<I from the channel vectors $\hat{h}_z(n_j)$ defined in equation (17). Followed by construction of the matrix H=[h(n(1)IT$_e$) ... h(n(L$_c$)IT$_e$)] from equation (11) with the h(nIT$_e$+jT$_e$) values in order to apply the parametric estimation method [8] for the multipaths: $(\theta_p, \tau_p)$ $1 \leq p \leq P$.

Second Way of Implementing the Process

FIGS. 8 and 9 show schematically another way of implementing the process, which may include two variants corresponding to the decorrelated multipath case and to the group-wise correlated multipath case, respectively.

Decorrelated Multipath Case.

The signal is received in baseband with $\{b_k\}=\{a_k\}$.

The multipaths, the delays of which satisfy the relationship $|\tau_j-\tau_i|>(2L_0+1)T$, have the advantage of being decorrelated with one another, satisfying the equation: $E[s(t-\tau_i)s(t-\tau_j)^*]=0$. By examining equation (4), it may therefore be seen that it is sufficient to apply an ICA type method when P≦N to the observation x(t) in order to obtain the signals $s(t-\tau_p)$ for each of the multibars. After estimating the signals for the various multipaths, the process determines their powers in order to keep the signal $s(t-\tau_{pmax})$ of the multipath of higher amplitude $\rho_{pmax}$. This main path is determined using the fact that the outputs of the ICA methods asymptotically satisfy:

$$x(t) = \sum_{p=1}^{P} \rho_p a(\theta_p) s(t - \tau_p) \quad (20)$$

$$= \sum_{p=1}^{P} \hat{a}_i \hat{s}_i(t) \text{ with}$$

$$\hat{s}_i(t) = \frac{s(t - \tau_p)}{\sqrt{\gamma_p}} \text{ and}$$

$$\hat{a}_i = \sqrt{\gamma_p} \, \rho_p a(\theta_p)$$

where $\gamma_p = \rho_p^2 E[|s(t-\tau_p)|^2]$. Since the vectors $a(\theta_p)$ are normed, satisfying the equation $a(\theta_p)^H a(\theta_p) = N$, the path of maximum amplitude will be associated with the $i_{max}^{th}$ output where $\alpha_{imax} = \hat{a}_{imax}^H \hat{a}_{imax}$ is a maximum. From equation (3), the output $\hat{s}_{imax}(t) = s(t - \tau_{pmax})$ satisfies the equation:

$$\hat{s}_{imax}(mIT_e + jT_e) = \sum_{n=-L_0}^{L_0} h_{F0}(nIT_e + jT_e - \tau_{pmax}) a_{m-n} \quad (21)$$

such that $0 \leq j < I$ and it is possible to constitute the following observation vector:

$$z(mIT_e) = \begin{bmatrix} \hat{s}_{imax}(mIT_e) \\ \hat{s}_{imax}(mIT_e + T_e) \\ \vdots \\ \hat{s}_{imax}(mIT_e + (I-1)T_e) \end{bmatrix} \quad (22)$$

$$= \sum_{n=-L_0}^{L_0} h_z(n) a_{m-n}$$

where $h_z(n) = \begin{bmatrix} h_{n,0} \\ h_{n,1} \\ \vdots \\ h_{n,I-1} \end{bmatrix}$ and where $h_{n,j} = h_{F0}(nIT_e + jT_e - \tau_{pmax})$. According to the model of equation (22), it is sufficient to apply an ICA method to the observation $z(mIT_e)$ in order to estimate the $2L_0+1$ symbol trains $\{a_{m-n}\}$ with $-L_0 \leq n \leq L_0$. To extract the angles of incidence $\theta_p$ of the propagation channel, it is sufficient from equation (20) to find, for each signature $\hat{a}_i$ ($1 \leq i \leq P$), the maximum of criterion $c(\theta) = |a(\theta)^H \hat{a}_i|^2$. To extract the delays $\tau_i - \tau_1$ of the propagation channel, it is sufficient from equation (20) to find, for each signal $\hat{s}_i(t)$ ($1 \leq i \leq P$), the maximum of the $c(\tau) = |\hat{s}_i(t-\tau) \hat{s}_1(t)^*|^2$ criterion.

To summarize, this variant comprises, for example, the following steps:

Step II.a.1: Determination of the symbol period T, applying a cyclic detection algorithm as in [1] [10].

Step II.a.2: Sampling of the observations $x(t)$ with I samples per symbol such that $T=IT_e$.

Step II.a.3: Application of an ICA method to the observations $x(t)$ in order to obtain $\hat{s}_i(t)$ and $\hat{a}_i$ for $1 \leq i \leq P$.

Step II.a.4: Determination of the output $i=imax$ where $\alpha_i = \hat{a}_i^H \hat{a}_i$ is its maximum.

Step II.a.5: Formation of the observation vector $z(t)$ of equation (22) from the signal $\hat{s}_{imax}(t)$.

Step II.a.6: Application of an ICA method for estimating the symbol trains $\{a_{m-n}\}$ where $-L_0 \leq n \leq L_0$. From the symbol trains is chosen that one which is associated with the higher-modulus vector $h_z(n)$, namely $\{\hat{a}_m\}$.

Step II.a.7: Determination of the phase $\alpha_{imax}$ of the output associated with the higher-modulus vector $h_z(n)$ applying steps B.1, B.2 et B.3.

Step II.a.8: Phase-resetting of the symbol train $\{\hat{a}_m\}$ by taking $\hat{\hat{a}}_m = \hat{a}_m \exp(-j\alpha_{imax})$. The symbol train $\{\hat{\hat{a}}_m\}$ constitutes the output of the demodulator of this subprocess.

Step II.a.9: Estimation of the propagation channel parameters, namely angle $\theta_p$ and delay $\tau_p$, by maximizing, for $1 \leq i \leq P$ the $|a(\theta)^H \hat{a}_i|^2$ and $|\hat{s}_i(t-\tau)\hat{s}_1(t)^*|^2$ criteria for the angles and delays respectively.

General Case for any or Groupwise-Correlated Multipaths

In this variant, the diagram for which is given in FIG. 9, the process considers that some of the multipaths are correlated. Considering that the transmitter is received according to Q groups of correlated multipaths, the signal vector received by the sensors becomes, from equation (4):

$$x(t) = \sum_{q=1}^{Q} \sum_{p=1}^{P_q} \rho_{p,q} a(\theta_{p,q}) s(t - \tau_{p,q}) + b(t) \quad (23)$$

$$= \sum_{q=1}^{Q} A_q \Omega_q s(t, \underline{\tau}_q) + b(t)$$

Where $A_q = [a(\theta_{1,q}) \ldots a(\theta_{Pq,q})]$, $\Omega_q = \text{diag}([\rho_{1,q} \ldots \rho_{Pq,q}])$ and $s(t, \underline{\tau}_q) = [s(t-\tau_{1,q}) \ldots s(t-\tau_{Pq,q})]^T$ with $\underline{\tau}_q = [\tau_{1,q} \ldots \tau_{Pq,q}]^T$. The following signals and signatures are estimated as output of the separator by applying an ICA method:

$$\hat{A} = [\hat{a}_1 \ldots \hat{a}_{PQ,Q}] \quad (24)$$

$$= [A_1 U_1 \ldots A_Q U_Q] \Pi \text{ and}$$

$$\hat{s}(t) = \Pi \begin{bmatrix} V_1 s(t, \underline{\tau}_1) \\ \vdots \\ V_Q s(t, \underline{\tau}_Q) \end{bmatrix}$$

$$= \begin{bmatrix} \hat{s}_1(t) \\ \vdots \\ \hat{s}_{P_Q \times Q}(t) \end{bmatrix}$$

where $\Pi$ is a permutation matrix, $U_q V_q = \Omega_q$ and $V_q E[s(t, \underline{\tau}_q) s(t, \underline{\tau}_q)^H] V_q^H = I_{Pq}$. Thus, the paths decorrelated such that $E[s(t-\tau_{p,q}) s(t-\tau_{p',q'})^*] = 0$ are received on different channels $\hat{s}_i(t)$ and $\hat{s}_j(t)$. The correlated paths where $E[s(t-\tau_{p,q}) s(t-\tau_{p',q'})^*] \neq 0$ are mixed in the same channel $\hat{s}_i(t)$ and are present on $P_Q$ at the same time. In the 1st step of this subprocess, we use this result to identify the Q group of correlated multipaths. Taking the outputs i and j of the separator, the two following hypotheses may be tested:

$$H_0: \begin{cases} \hat{s}_i(t) = b_i(t) \\ \hat{s}_j(t) = b_j(t) \end{cases} \text{ and } H_1: \begin{cases} \hat{s}_i(t) = \alpha_i s(t - \tau_p) + b_i(t) \\ \hat{s}_j(t) = \alpha_j s(t - \tau_p) + b_j(t) \end{cases} \quad (25)$$

where $E[b_i(t) b_j(t-\tau)^*]=0$ whatever the value of $\tau$. Thus for the $H_0$ hypothesis, no multipaths exist common to the two output i and j, and for the $H_1$ hypothesis there is at least one of them. The test consists in determining whether the outputs $\hat{s}_i(t)$ and $\hat{s}_j(t-\tau)$ are correlated for at least one of the $\tau$ values satisfying $|\tau|<\tau_{max}$. To do this, the Gardner test [3] is applied, which compares the following likelihood ratio with a threshold:

$$V_{ij}(\tau) = -2K\ln\left(1 - \frac{|\hat{r}_{ij}(\tau)|^2}{\hat{r}_{ii}(0)\hat{r}_{jj}(0)}\right) \text{ with} \quad (26)$$

$$\hat{r}_{ij}(\tau) = \frac{1}{K}\sum_{k=1}^{K} \hat{s}_i(t)\hat{s}_j(t-\tau)^* \text{ or}$$

$V_{ij}(\tau) < \eta \Rightarrow$ hypothesis $H_0$

And $V_{ij}(\tau) \geq \eta \Rightarrow$ hypothesis $H_1$

The threshold $\eta$ is determined in [3] in relation to a chi square law with 2 degrees of freedom. The output associated with the 1st output are firstly sought by starting the test by $2 \leq j \leq P_Q \times Q$ and $i=1$. Next, removed from the list of outputs are all those associated with the 1st which will constitute the 1st group with $q=1$. The same series of tests is then restarted with the other outputs not correlated with the 1st output in order to constitute the 2nd group. This operation will be carried as far as the last group where, in the end, no output channel will remain. After the sorting, what will finally be obtained are:

$$\hat{A}_q = A_q U_q \text{ and } \hat{s}_q(t) = V_q s(t,\underline{\tau}_q) \text{ for } (1 \leq q \leq Q) \quad (27)$$

The angles of incidence $\theta_{p,q}$ are determined from the $\hat{A}_q$ values for $(1 \leq q \leq Q)$ applying the MUSIC [1] algorithm to the $\hat{A}_q \hat{A}_q^H$ matrix. The matrices $A_q$ are deduced from these goniometry values. Since is it known that $x_q(t)=\hat{A}_q \hat{s}_q(t)= A_q \Omega_q s(t,\underline{\tau}_q)$, $s(t,\underline{\tau}_q)$ is deduced therefrom to within a diagonal matrix by taking $\hat{s}(t,\underline{\tau}_q)=A_q^\# X_q(t)$. Since the elements of $\hat{s}(t,\underline{\tau}_q)$ are composed of the signals $\hat{s}(t-\tau_{p,q})$, the delays $\tau_{p,q} - \tau_{1,1}$ are determined by maximizing the $c(\tau)=|\hat{s}_{q,p}(t-\tau)\hat{s}_{1,1}(t)^*|^2$ criteria where $\hat{s}_{q,p}(t)$ is the $p^{th}$ component of $\hat{s}(t,\underline{\tau}_q)$.

Since it is known that $E[\hat{s}_q(t)\hat{s}_q(t)^H]=I_{Pq}$, that $A_q^H A_q = N I_{Pq}$ and that $\hat{A}_q \hat{s}_q(t)=A_q \Omega_q s(t,\underline{\tau}_q)$, it is deduced therefrom that the group of multipaths associated with the largest amplitudes $\Omega_q$ maximizes the following criterion: $cri(q)=trace(\hat{A}_q^H \hat{A}_q)$. From this is deduced the best output associated with $\hat{A}_{qmax}$ and $\hat{s}_{qmax}(t)$. Since from equation (3) the vector $s(t, \underline{\tau}_{qmax})$ satisfies equation:

$$s(mlT_e + jT_{e,\underline{\tau}qmax}) = \begin{bmatrix} s(mlT_e + jT_e - \tau_{qmax1}) \\ \vdots \\ s(mlT_e + jT_e - \tau_{qmaxP_{qmax}}) \end{bmatrix} \quad (28)$$

$$= \sum_{n=-L_0}^{L_0} h_{F0}(nlT_e + jT_{e,\underline{\tau}qmax})a_{m-n}$$

$$0 \leq j < 1 \text{ and with } h_{F0}(nlT_e + jT_{e,\underline{\tau}qmax}) = \begin{bmatrix} h_{F0}(nlT_e + jT_e - \tau_{qmax,1}) \\ \vdots \\ h_{F0}(nlT_e + jT_e - \tau_{qmax,P_{qmax}}) \end{bmatrix}$$

for it is possible to constitute the following observation vector from equation (27):

$$z(mlT_e) = \begin{bmatrix} \hat{s}_{qmax}(mlT_e) \\ \hat{s}_{qmax}(mlT_e + T_e) \\ \vdots \\ \hat{s}_{qmax}(mlT_e + (I-1)T_e) \end{bmatrix} \quad (29)$$

$$= \sum_{n=-L_0}^{L_0} h_z(n)a_{m-n}$$

where $h_z(n) = \begin{bmatrix} h_{n,0} \\ h_{n,1} \\ \vdots \\ h_{n,I-1} \end{bmatrix}$ where $h_{n,j}=V_{qmax}h_{F0}(nIT_e+jT_e,\underline{\tau}_{qmax})$. From the model of equation (29), it is sufficient to apply an ICA method to the observation $z(mlT_e)$ in order to estimate the $2L_0+1$ symbol trains $\{a_{m-n}\}$ such that $-L_0 \leq n \leq L_0$.

To summarize, this variant comprises the following steps:

Step II.b.1: Determination of the symbol period T by applying a cyclic detection algorithm as in [1] and [10].

Step II.b.2: Sampling of the observations $x(t)$ with I samples per symbol such that $T=IT_e$.

Step II.b.3: Application of an ICA method to the observations $x(t)$ in order to obtain $\hat{s}(t)$ and $\hat{A}$ from equation (24).

Step II.b.4: Sorting of the outputs according to Q groups of correlated multipaths in order to obtain $\hat{A}_q$ and $\hat{s}_q(t)$ for $(1 \leq q \leq Q)$: to do this, a correlation test for all the output pairs i and j with the two-hypothesis test of equation (26). Firstly the outputs associated with the 1st output will be sought by starting the test for $2 \leq j \leq P_Q \times Q$ and $i=1$. Next, removed from the list of outputs are all those associated with the 1st that will constitute the 1st group with $q=1$. The same series of tests is repeated with the other outputs that are not correlated with the 1st output in order to constitute the 2nd group. This operation is continued to the last group where in the end no output channel will remain.

Step II.b.5: Determination of the better group of multipaths where $(\hat{A}_q^H \hat{A}q)$ is a maximum in $q=qmax$.

Step II.b.6: Constitution of the observation vector $z(t)$ of equation (29) from the signal $\hat{s}_{qmax}(t)$.

Step II.b.7: Application of an ICA method for estimating the symbol trains $\{a_{m-n}\}$ where $-L_0 \leq n \leq L_0$. From the symbol trains is chosen that one which is associated with the higher-modulus vector $h_z(i)$, namely $\{\hat{a}_{m-i}\}$.

Step II.b.8: Determination of the phase $\alpha_{imax}$ of the output associated with the higher-modulus vector $h_z(i)$ applying steps B.1, B.2 and B.3.

Step II.b.9: Phase-resetting of the symbol trains $\{\hat{a}_m\}$ by taking $\hat{\hat{a}}_m = \hat{a}_m \exp(-j\alpha_{imax})$. The symbol train $\{\hat{\hat{a}}_m\}$ constitutes the output of the demodulator of this subprocess.

Step II.b.10: Estimation of the propagation channel parameters, namely the angle $\theta_{q,p}$ and the delay $\tau_{q,p}$. The angles of incidence $\theta_{q,p}$ are determined from the $\hat{A}_q$ values for ($1 \leq q \leq Q$) applying the MUSIC [1] algorithm to the matrix $\hat{A}_q \hat{A}_q^H$. The matrices $A_q$ are deduced from these goniometry values in order to deduce therefrom an estimate of $s(t, \underline{\tau}_q)$ taking $\hat{s}(t,\underline{\tau}_q) = A_q^{\#} X_q(t)$. Since the elements of the $\hat{s}(t,\underline{\tau}_q)$ are composed of the signals $s(t-\tau_{q,p})$, the delays $\tau_{p,q} - \tau_{1,1}$ are determined by maximizing the $c(\tau) = |\hat{s}_{q,p}(t-\tau)\hat{s}_{1,1}(t)^*|^2$ criteria where $\hat{s}_{q,p}(t)$ is the $p^{th}$ component of $\hat{s}(t,\underline{\tau}_q)$.

Another way of Implementing the Process Estimation of the Carrier Frequency and Deduction of the $\{a_m\}$ Symbols.

This technique consists in estimating the carrier frequency $f_0$ of the transmitter or the complex $z_0 = \exp(j2\pi f_0 T_e)$ in order thereafter to deduce the symbols $\{a_m\}$ from the symbols $\{b_m\}$, taking, from equation (3):

$$a_m = b_m \exp(-j2\pi f_0 mIT_e) = b_m z_0^{-mI} \quad (30)$$

This step is applied after step I.4 of reordering the symbols and the channel vectors. From equations (3), (17), (7) and (8), the following channel vectors are used:

$$\hat{h}_z(n) = \begin{bmatrix} z_0^{nl} h(nlT_e) \\ z_0^{nl+1} h(nlT_e + T_e) \\ \vdots \\ z_0^{nl+(l-1)} h(nlT_e + (l-1)T_e) \end{bmatrix} \text{ for } n \in \Omega \quad (31)$$

where $\Omega = \{\text{Ind}_{[rp-L0, \, rp+L0]}(n) = 1 \text{ for a } p \text{ such that } 1 \leq p \leq P\}$ Since it is known that $\Omega = \{n_1 < \ldots < n_{Lc}\}$, a grand vector b is obtained from the vectors $\hat{h}_z(n)$, such that:

$$w = \begin{bmatrix} \hat{h}_z(n_1) \\ \hat{h}_z(n_2) \\ \vdots \\ \hat{h}_z(n_K) \end{bmatrix} \quad (32)$$

The search for $f_0$ consists in maximizing the following criterion:

$$\text{Carrier}(f_0) = |w^H c(\exp(j2\pi f_0 T_e))|^2 \quad (33)$$

$$\text{where } c(z_0) = \begin{bmatrix} c(n_1, z_0) \\ c(n_2, z_0) \\ \vdots \\ c(n_K, z_0) \end{bmatrix} \text{ and}$$

$$\text{where } c(n, z_0) = \begin{bmatrix} z_0^{nl} \\ z_0^{nl+1} \\ \vdots \\ z_0^{nl+(l+1)} \end{bmatrix}$$

The steps of the process suitable for the case of a transmitter with a non-zero frequency are the following:

Step III.a.1: Step I.1 to step I.4 described above in order to obtain the symbol trains $\{\hat{b}_{m-k_j}\}$ associated with the channel vectors $\hat{h}_z(k_j)$.

Step III.a.2: Construction of the vector w of equation (32) from the $\hat{h}_z(k_j)$.

Step III.a.3: Maximization of the carrier ($f_0$) criterion of equation (33) in order to obtain $f_0$.

Step III.a.4: Application of equation (30) in order to deduce the symbols $\{a_m\}$ from the symbols $\{b_m\}$.

Step III.a.5: Step I.5 to step I.7 described above.

In the case of a transmitter with non-zero frequency and for decorrelated multipaths, the steps are the following:

Step III.b.1: Step II.a.1 to Step II.a.4 described above in order to obtain the vector z(t) of equation (22).

Step III.b.2: Application of the ICA methods [4], [5], [15] and [19] in order to estimate $L_c$ symbol trains $\{\hat{b}_{m,j}\}$ associated with the channel vectors $\hat{h}_{z,j}$.

Step III.b.3: Reordering of the symbol trains $\{\hat{b}_{m,j}\}$ and of the channel vectors $\hat{h}_{z,j}$ applying steps A.1, A.2 and A.3 in order to obtain the symbol trains $\{\hat{b}_{m-k_j}\}$ associated with the channel vectors $\hat{h}_{z,j} = \hat{h}_z(k_j)$.

Step III.b.4: Construction of the vector w of equation (32) from the $\hat{h}_z(k_j)$.

Step III.b.5: Maximisation of the carrier ($f_0$) criterion of equation (33) in order to obtain $f_0$.

Step III.b.6: Application of equation (30) in order to deduce the symbols $\{a_m\}$ from the symbols $\{b_m\}$.

Step III.b.7: Choice of the symbol train associated with the higher-modulus vector $h_z(i)$, namely, $\{\hat{a}_{m-i}\}$.

Step III.b.8: Step II.a.7 to step II.a.9 described above.

In the case of a transmitter with non-zero frequency and for correlated multipaths, the steps are for example the following:

Step III.c.1: Step II.b.1 to step II.b.6 No. 2.2 in order to obtain the vector z(t) of equation (29).

Step III.c.2: Application of ICA methods [4], [5], [15] and [19] in order to estimate the $L_c$ symbol trains $\{\hat{b}_{m,j}\}$ associated with the channel vectors $\hat{h}_{z,j}$.

Step III.c.3: Reordering of the symbol trains $\{\hat{b}_{m,j}\}$ and of the channel vectors $\hat{h}_{z,j}$ applying steps A.1, A.2 and A.3 so as to obtain the symbol trains $\{\hat{b}_{m-k_j}\}$ associated with the channel vectors $\hat{h}_{z,j} = \hat{h}_z(k_j)$.

Step III.c.4: Construction of the vector w of equation (32) from the $\hat{h}_z(k_j)$.

Step III.c.5: Maximization of the carrier criterion ($f_0$) of equation (33) in order to obtain $f_0$.

Step III.c.6: Application of equation (30) for deducing the symbols $\{a_m\}$ from the symbols $\{b_m\}$.

Step III.c.7: Choice among the symbol trains of that one which is associated with the higher-modulus vector $h_z(i)$, namely $\{\hat{a}_{m-i}\}$.

Step III.c.8: Step II.b.8 to step II.b.10 described above.

REFERENCES

[1] R. O. Schmidt, "A signal subspace approach to multiple emitter location and spectral estimation", November 1981.

[2] W. A. BROWN, "Computationally efficient algorithms for cyclic spectral analysers", 4$^{th}$ ASSP Workshop on Spectrum Modelling, August 1988.

[3] S. V. SCHELL and W. GARDNER, "Detection of the number of cyclostationary signals in unknowns interference and noise", Proc, Asilonan Conference on Signal, Systems and Computers, 5-9 Nov. 1990.

[4] J. F. CARDOSO and A. SOULOUMIAC, "Blind beamforming for non-Gaussian signals", IEE Proceedings-F, Vol. 140, No. 6, pp. 362-370, December 1993.

[5] P. COMON, "Independent Component Analysis, a new concept?", Signal Processing, Elsevier, April 1994, Vol 36, No. 3, pp. 287-314.

[6] S. MAYRARGUE, "A blind spatio-temporal equalizer for a radio-mobile channel using the Constant Modulus Algorithm CMA", ICASSP 94, 1994 IEEE International Conference on Acoustics Speech and Signal Processing, 19-22 Apr. 1994, Adelaide, South Australia, pp. 317-319.

[7] E. MOULINES, P. DUHAMEL, J. F. CARDOSO and S. MAYRARGUE, "Subspace methods for the blind identification of multichannel FIR filters", IEEE Transactions On Signal Processing, Vol. 43, No. 2, pp. 516-525, February 1995.

[8] V. VANDERVEEN, "Joint Angle and delay Estimation (JADE) for signal in multipath environments", 30$^{th}$ ASILOMAR Conference in Pacific Grove, IEEE Computer Society, Los Alamitos, Calif., USA, 3-6 Nov. 1996.

[9] P. CHEVALIER, V. CAPDEVIELLE, and P. COMON, "Behavior of HO blind source separation methods in the presence of cyclostationary correlated multipaths", IEEE SP Workshop on HOS, Alberta (Canada), July 1997.

[10] A. FERREOL, Patent No. 98/00731. "Procédé de détection cyclique en diversité de polarisation" [Cyclic detection method in polarization diversity], 23 Jan. 1998.

[11] C. B. PAPADIAS and D. T. M. SLOCK, "Fractionally spaced equalization of linear polyphase channels and related blind techniques based on multichannel linear prediction", IEEE Transactions On Signal Processing", March 1999, Vol. 47, No. 3, pp 641-654.

[12] E. DE CARVALHO and D. T. M. SLOCK, "A fast Gaussian maximum-likelihood method for blind multichannel estimation", SPAWC 99, Signal Processing Advances in Wireless Communications, 9-12 May 1999, Annapolis, US, pp. 279-282.

[13] H. ZENG et L. TONG, "Blind channel estimation using the second-order statistics: Algorithms", IEEE Transactions On Signal Processing, August 1999, Vol. 45, No. 8, pp. 1919-1930.

[14] A. FERREOL and P. CHEVALIER, "On the behavior of current second- and higher-order blind source separation methods for cyclostationary sources", IEEE Trans. Sig. Proc., Vol. 48, No. 6, pp. 1712-1725, June 2000.

[15] P. COMON, "From source separation to blind equalization, contrast-based approaches", ICISP 01, Int. Conf. on Image and Signal Processing, 3-5 May 2001, Agadir, Morocco, pp. 20-32.

[16] L. PERROS-MEILHAC, E. MOULINES, K. ABED-MERAIM, P. CHEVALIER and P. DUHAMEL, "Blind identification of multipath channels: A parametric subspace approach", IEEE Transactions On Signal Processing, Vol. 49, No. 7, pp. 1468-1480, July 2001.

[17] I. JANG and S. CHOI, "Why blind source separation for blind equalization of multiple channels?", SAM 02, Second IEEE Sensor Array and Multichannel Signal Processing Workshop, 4-6 Aug. 2002, Rosslyn, US, pp. 269-272.

[18] A. FERREOL, L. ALBERA and P. CHEVALIER, Higher-order blind separation of non zero-mean cyclostationary sources", (EUSIPCO 2002), Toulouse, 3-6 Sep. 2002, pp. 103-106.

[19] L. ALBERA, A. FERREOL, P. CHEVALIER and P. COMON, "ICAR, un algorithme d'ICA à convergence rapide, robuste au bruit [ICAR, a noise-robust rapidly convergent ICA algorithm"], GRETSI, Paris, 2003.

[20] Z. DING. and J. LIANG, "A cumulant matrix subspace algorithm for blind single FIR channel identification", IEEE Transactions On Signal Processing, Vol. 49, No. 2, pp. 325-333, February 2001.

The invention claimed is:

1. A process for the blind demodulation of a linear-waveform source or transmitter in a system including one or more sources and an array of sensors and a propagation channel, said process comprising steps of:
   determining symbol period T and taking samples at $T_e$, such that $T=IT_e$, wherein I is an integer number and $T_e$ is the sampling period;
   constructing a spatio-temporal observation vector z(t), the mixed sources of which are symbol trains from the transmitter, from observations $x(t_k)$ taken at times $t_k$, where the time $t_k$ corresponds to $kT_e$ where k is an integer;
   applying an Independent Component Analysis (ICA)-type method to the observation vector z(t) in order to estimate for a number of input symbol trains $\{a_{m-i}\}$ corresponding to a number of symbols $L_c$ participating in an intersymbol interference, the input symbol trains $\{a_{m-i}\}$ corresponding to observations, where m and i are positive integers, the estimate outputs $\{â_{m,i}\}$ being associated with the channel vectors $ĥ_{z,j}=ĥ_z(k_j)$, z corresponding to a sensor in the array and j corresponding to a number of an estimate output;
   arranging the $L_c$ outputs $(â_{m,j}, ĥ_{z,j})$ in the same order as the inputs $(a_{m-i}, ĥ_z(i))$ so as to obtain the propagation channel vectors $ĥ_{z,j}=ĥ_z(k_j)$; and
   determining a phase $\alpha_{imax}$ associated with the outputs.

2. The process as claimed in claim 1, further comprising estimating propagation channel parameters in order to determine a carrier frequency so as to compensate for the symbol trains in order to obtain the symbol trains in baseband.

3. The process as claimed in claim 1, further comprising a step of estimating angle $\theta_p$ and delay $\tau_p$ parameters of the propagation channel, where p is a positive integer.

* * * * *